4 Sheets—Sheet 1.
J. H. & G. D. WAGNER.
FILTERING APPARATUS.
No. 28,524. Patented May 29, 1860.
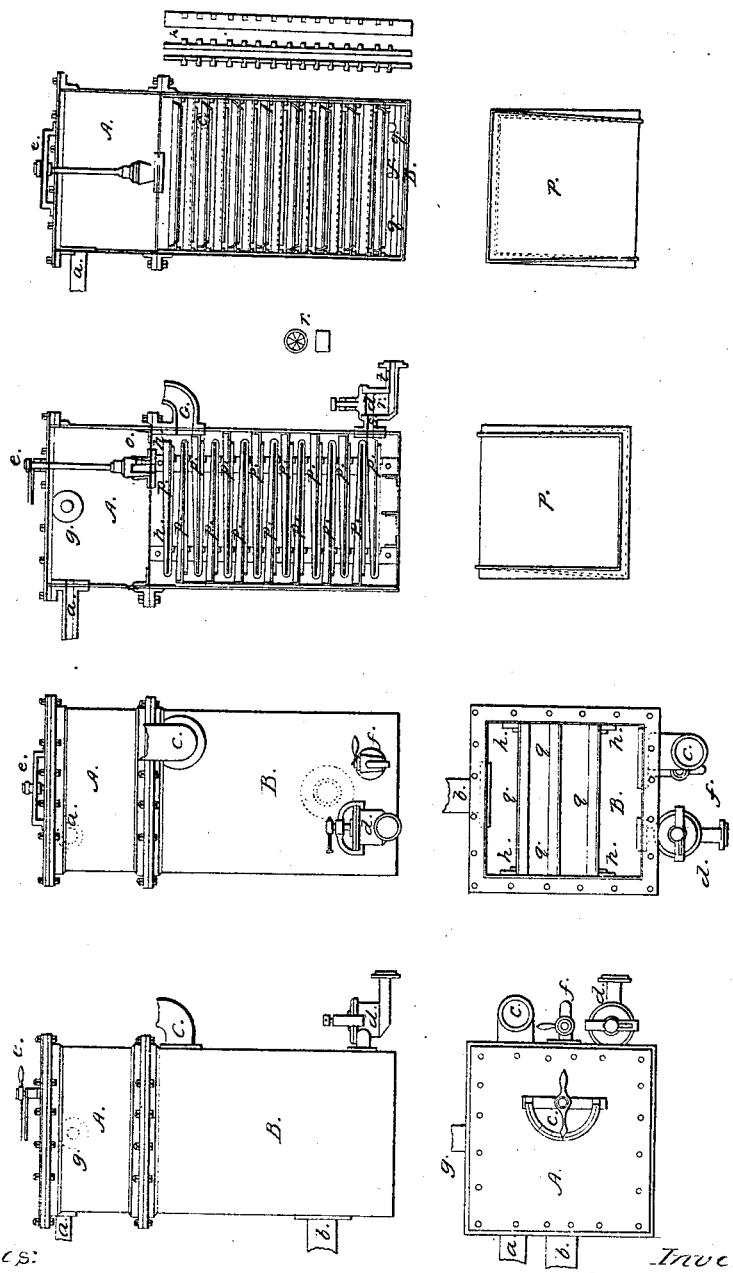

J. H. & G. D. WAGNER.
FILTERING APPARATUS.
No. 28,524.  Patented May 29, 1860.
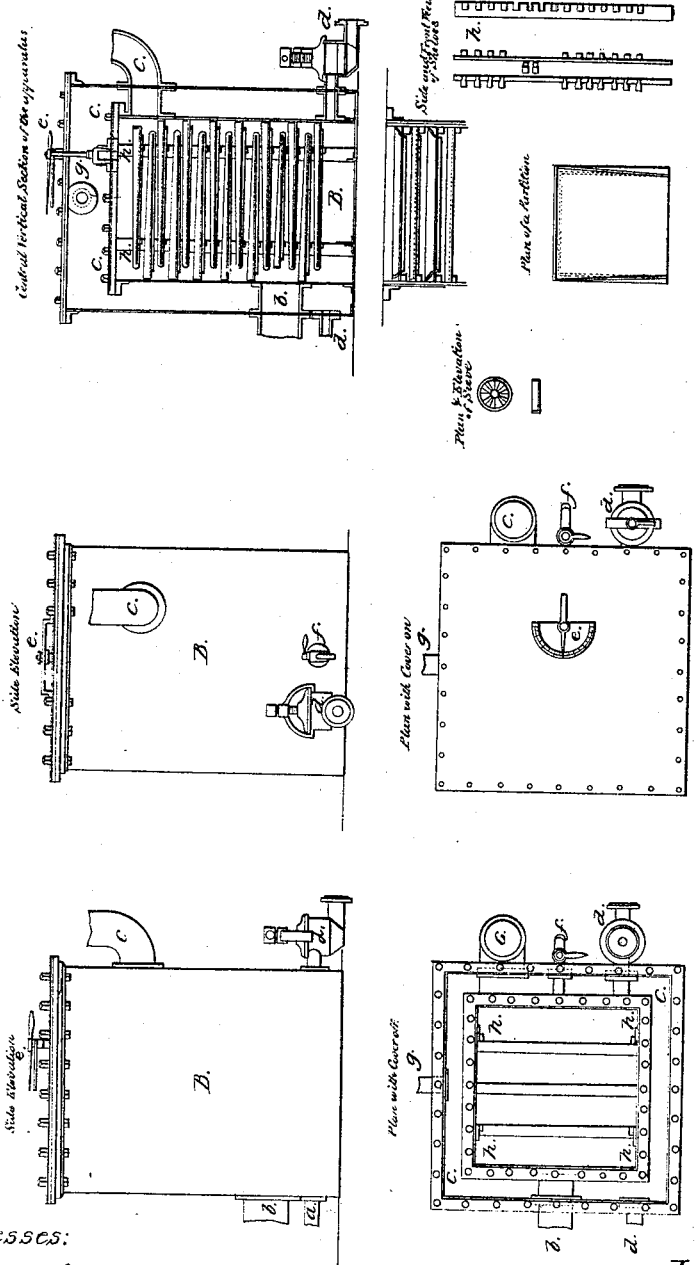

4 Sheets—Sheet 3.
J. H. & G. D. WAGNER.
FILTERING APPARATUS.
No. 28,524.                            Patented May 29, 1860.
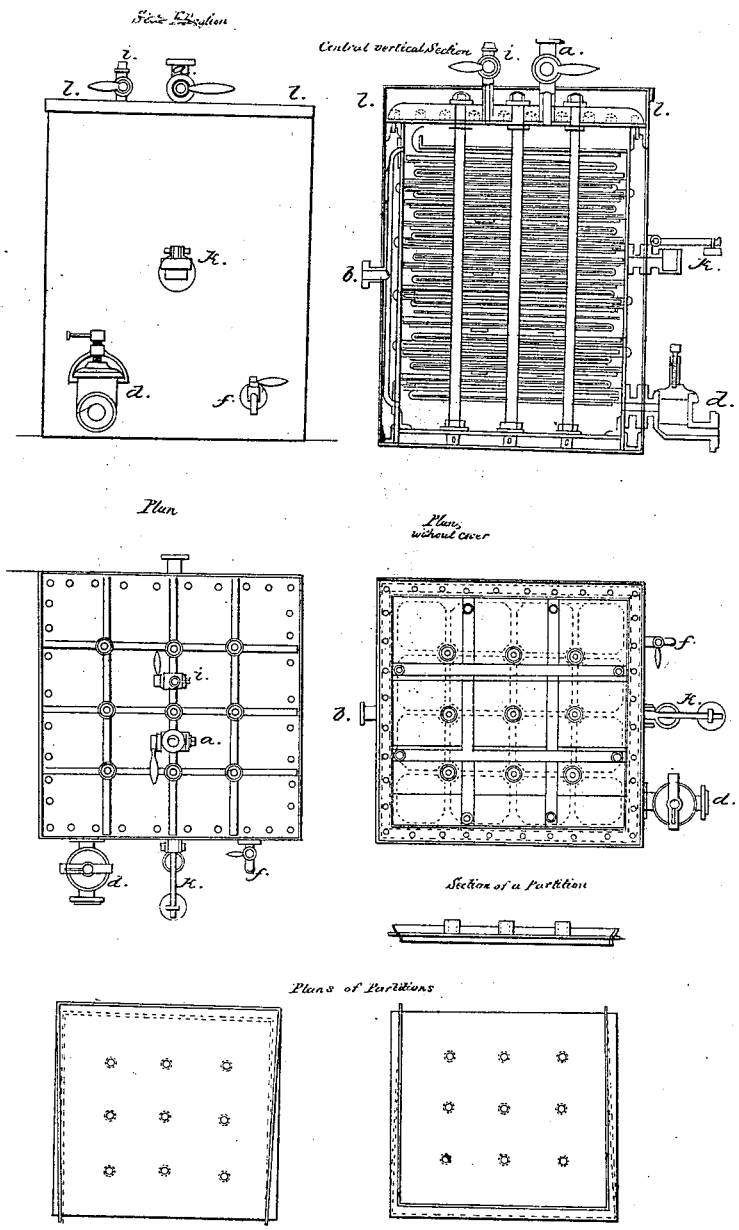
Witnesses:
J. N. Coombs.
R. S. Spencer.
Inventor:
G. H. & G. D. Wagner
per Munn & Co. Solicitors and Attorneys 4 Sheets—Sheet 4
J. H. & G. D. WAGNER.
FILTERING APPARATUS.
No. 28,524.  Patented May 29, 1860.
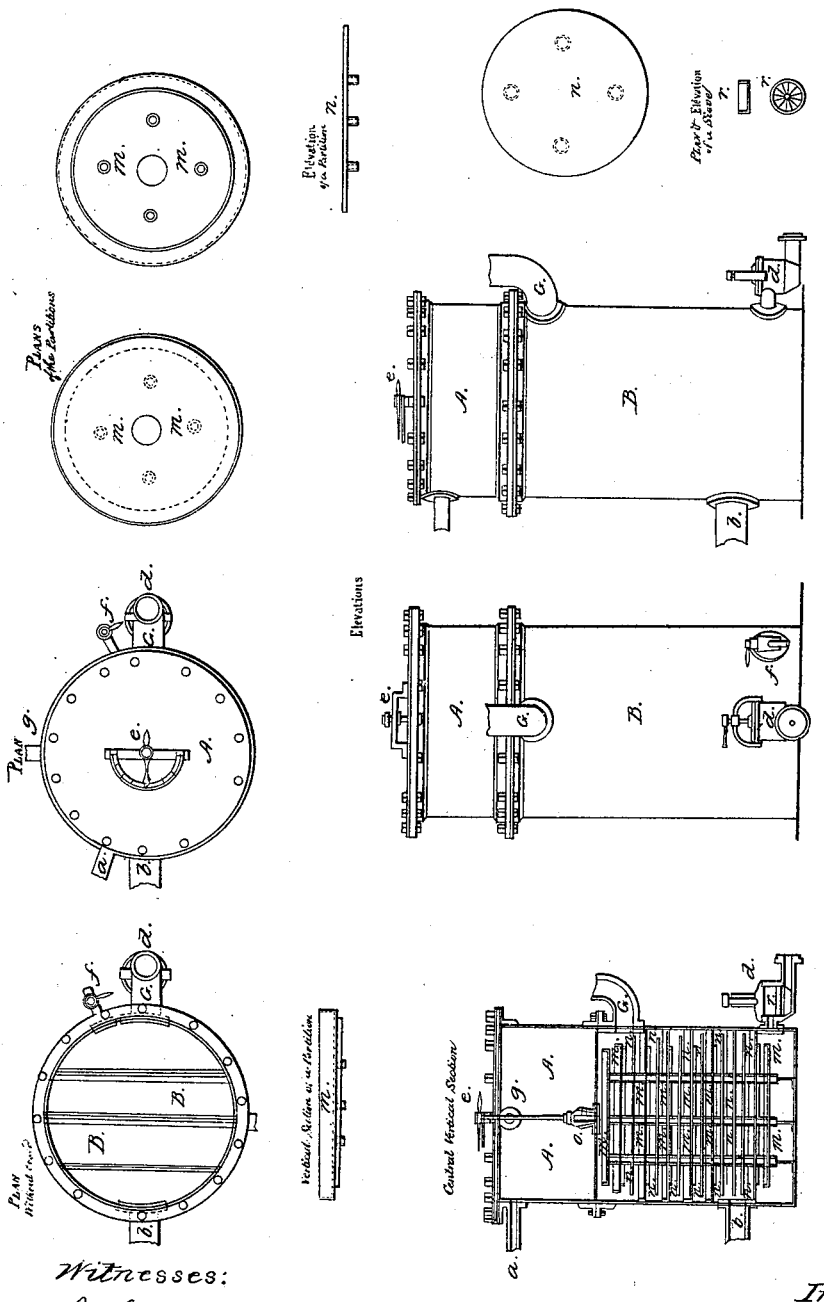

UNITED STATES PATENT OFFICE.

J. H. G. D. WAGNER, OF PARIS, FRANCE.

FILTERING APPARATUS.

Specification of Letters Patent No. 28,524, dated May 29, 1860.

*To all whom it may concern:*

Be it known that I, JEAN HENRI GUILLAUME DANIEL WAGNER, of Paris, in the Empire of France, manufacturer, have invented apparatus for cleaning water and removing all matters in suspension and dissolution contained in it, water intended to feed generators of all sorts, (applicable also to other purposes,) which, besides, previous to its getting into the generators is heated to the highest degree without almost any expense; and I do hereby declare the following to be a full, clear, and exact description of the same, reference being had to the accompanying drawings, making part of this specification, in which—

Plate 1, of the accompanying drawings, represents my invention applied to purifying water, or other liquids. Plate 2, the same, the general form of the apparatus being cylindric instead of rectangular, as represented on Plate 1. Plate 3, represents a modification of the apparatus when applied to high pressure steam engines, for the combined purpose of condensing the exhaust steam and purifying the feed water. Plate 4, represents another modification of the apparatus when applied to low pressure or condensation steam engines, for the purpose of purifying the feed water.

Figures 1, and 2, of Plate 1, are vertical side views. Figs. 3, and 4, vertical central sections, taken at right angles to each other. Fig. 5, a plan of the apparatus. Fig. 6, a plan, showing the inside bottom of the apparatus, the top part A, and the shelves $p$ being removed. Figs. 7, and 8, bottom and top views of one of the shelves. Fig. 9, vertical section; Fig. 10, side view, and Fig. 11, front view of the brackets which support the shelves.

Similar letters of reference indicate like parts in each of the accompanying drawings.

The nature of my invention consists, first, in removable horizontal shelves $p$, the bottom and top surfaces of each of these shelves being provided with flanges on three sides, and the shelves being placed in relation to each other as shown on Plate 1, in combination with a steam tight box B, water reservoir A, and stop cock $o$; second, in disks $m$, provided with circular flanges on top and bottom, with sockets $m'$, and central holes, in combination with disks $n$, provided with sockets $n'$, all the disks being placed in a steam tight box B, and in relation to each other as represented on Plate 2; third, in shelves, the top and bottom surfaces of each of which, are provided with flanges on three sides, combined with a steam tight box B, and a surrounding jacket $c'$, as represented on Plates 3, and 4.

To enable others skilled in the art, to make, and use, my invention, I will proceed to describe its construction and operation.

The apparatus represented on Plate 1, consists of a rectangular box the interior of which is provided with a horizontal partition $A'$, so as to divide the inner space into two parts, the upper, A, serving as a reservoir of water or other liquid to be purified, and the lower, B, containing the apparatus designed for purifying the liquid admitted from A, to B.

The reservoir A, is supplied with the water, or other liquid to be purified through a pipe $a$, and has an outlet pipe $g$, near its top to discharge the surplus water. The water passes from the reservoir A, into the space B, below the partition $A'$, through a hole in said partition which hole can be opened more or less by means of a stop cock $o$.

The stop cock can be operated, and thus the supply of water be regulated, by a suitable handle $e$, attached to the upper end of the cock shaft, above the top of reservoir A. A graduated arc is connected with the handle indicating the amount of water discharged corresponding to different positions of the handle and stop cock.

Near the bottom of the part B, of the box, there are three pipes $b$, $f$, and $s$, $t$. The pipe $b$, serves to supply B, with steam and is little above the line of the pipes $f$, and $s$, $t$, which line is intended to correspond with the level of the water at the bottom of B. The stop cock in pipe $f$, serves to test the height of this level above the bottom of B. Whenever water issues through pipe $f$, on opening the stop cock it indicates that the level of the water has risen to the height of pipe $f$, or above it, and then the supply of water from the reservoir must be correspondingly diminished so as to keep the level of the water at the bottom of B, below the mouth of steam pipe $b$. The pipe $s$, communicates with a receptacle $d$, containing a copper sieve $r$, and a piece of felt cloth on the top of this sieve. The top of this receptacle is fastened by means of a stirrup and screw so that it can easily be removed whenever it is desired to clean the sieve and insert a new piece of felt cloth. The bottom of the receptacle communicates with a pump by means of pipe *t*. The pump sucks the water from the bottom of B, through the filtering device *r*, and draws off the purified water.

The principal purifying device consists of a number of horizontal shelves *p*, placed one above the other in the space B. The shelves rest upon brackets or pins *h'*, screwed, or otherwise attached, to the inner sides of part B, of the box. Whenever it becomes necessary to clean the shelves, the reservoir A, is lifted off, and the brackets are taken off, so as to allow the shelves to be removed. The top and bottom surface of each of the shelves is provided with vertical flanges on three sides as seen in Figs. 7 and 8. The distance of the side flanges on the top surface of each shelf is greater at the back, 1, 2, than it is in front at 3, 4, (see Fig. 8,) while the distance of the side flanges on the under surface of each shelf, is at the back the same as at the front 3, 4, (see Fig. 7). The shelves are placed one above the other, so that the front edge of each will be above the back part of the next shelf, the front edges, however, to be at some distance from the sides of the box against which the back flanges rest, as seen in Fig. 3, so that the liquid running over the front edge of one shelf may fall onto the next shelf and not onto its back flange. As the side flanges are nearer together at the front edge (as seen at 3, 4,) than what they are at the back (as above described and represented at 1, 2,) no portion of the water running over the front edge of one shelf, can fall onto the side flanges of the next shelf. Thus all the water running over the front edge of one shelf will fall onto the lower shelf within the space confined by the flanges. This is necessary to prevent a portion of the water to find its way down along the sides of the box without having run over all the shelves, as is required for the proper purification of the water.

The stop cock *o*, is to be placed so as to admit the water from reservoir A, to space B, in a thin stream. Thus the water dropping onto the uppermost shelf instead of running fast over the shelf onto the next one and so forth, will spread over the horizontal surface of the uppermost shelf, and as the water accumulates a thin sheet of water will slowly find its way over the front edge of the shelf and will spread in a similar manner onto the next shelf and so on until it reaches the bottom of space B, where it is drawn off through pipes *s, t*, and filter *d, r*, by the action of the pump attached to pipe *t* as above set forth. A portion of the sheet of water running over the front edge of each shelf will in consequence of the law of adhesion spread near the front edge on the under surface of each shelf. This portion of the water (which is prevented by the bottom flanges of each shelf, from running onto the sides of the box) will slowly gather and finally drop off, onto the next shelf and there mingle with the rest of the water. The thin sheet of water thus running over all the top surfaces and partially over the bottom surfaces of all the shelves is constantly exposed to a high degree of heat by the steam admitted through pipe *b*, into space B. The steam ascends the zigzag open space between the shelves in a direction opposed to the direction in which the water moves, until it escapes through pipe *c*, near the partition A', into the space where the temperature is sufficiently low to condense the steam. The shelves and thin layers of water being highly heated by the steam ascending between the shelves, part of the water will evaporate and together with the steam originally admitted pass off through pipe *c*, into the condensing space above mentioned. The water here condensed (which is of course perfectly pure) may mix with the purified water drawn off through pipe *s, t*, and be supplied to a steam boiler or used for any other suitable purpose. It will be understood that the water while it spreads over the shelves and is partially converted into steam will deposit the foreign substances contained in it on the surface of the shelves and be perfectly pure by the time it has made its way over all the shelves and gathered at the bottom of space B. The temperature in the space B, being very high, the partition A' will be hot and consequently the water in reservoir A will be heated preparatory to its admission into space B, and its subsequent evaporation and purification be facilitated. Thus the whole arrangement constitutes a highly effective apparatus for the purification of water and other liquids.

Other liquids (for instance syrups) may be passed through this apparatus for the purpose of purification and condensation as will be understood without further description.

Plate 2, represents substantially the same apparatus as the one above described, the form of the box A, B, being cylindric instead of rectangular, the cylindric apparatus being cheaper to manufacture. The only difference besides the form of the box, consists in the arrangement of the shelves. They are in the shape of disks and are provided with sockets *n', m'*.

One set of the disks *m*, are each perforated in their centers and are of a diameter equal to the inside diameter of box B, and each of them is provided with a circular outside flange on its top surface and a circular flange of a somewhat smaller diameter on its bottom surface. The other set of disks *n*, are without flanges and of a diameter less than the diameter of the circular outside flange and larger than that of the circular bottom flange of the disks $m$. The two sets of disks are placed, one above the other, alternately; all in a horizontal position. The sockets of each disk rest upon the top surface of the disk below so as to maintain a proper distance between each two of the disks. The water admitted through stop cock $o$, spreads upon the uppermost disk $m$, and drops slowly through the central hole onto the disk $n$, below. Here it spreads again and runs over the circular edge $n$, on to the next disk $m$, and so forth until it arrives at the bottom of the box where it is drawn off through pipe $s$, $t$. The steam, enters through pipe $b$, and ascends through the central holes and between the shelves, until it finds its exit through pipe $c$, the operation being substantially the same as in the apparatus before described.

Plate 3, represents a modification of the apparatus as applicable to high pressure steam engines.

The box B, equivalent to space B in the apparatus first described is surrounded by a jacket $c'$, which serves as cold water reservoir. The exhaust steam enters through pipe $b$, and (as the temperature in box B, is not very high in consequence of the surrounding cold water jacket) the steam is condensed while passing up between the shelves. In every other respect the operation of the apparatus is similar to the one already described.

Plate 4, represents a modification of the apparatus when used as a combined purifier of feed water and integral part of a steam generator. The box containing the shelves is surrounded with a jacket $c'$, filled with a substance which is a bad conductor of heat. The steam enters from the main steam generator, through the bifurcated pipe $b$, and water is admitted through stop cock $a$. There being a high temperature maintained in the box, the water, while being purified, will be highly heated, and may be applied to the steam generator through pipe $s$, $t$, quite hot.

$k$, is a safety valve.

What I claim as my invention, and desire to secure by Letters Patent, is—

1. Removable horizontal shelves $p$, the bottom and top surfaces of each of these shelves being provided with flanges on three sides, and the shelves being placed in relation to each other as shown on Plate 1, in combination with a steam tight box B, water reservoir A, and stop cock $o$, substantially as, and for the purposes set forth.

2. Disks $m$, provided with circular flanges on top and bottom, with sockets $m'$, and central holes, in combination with disks $n$, provided with sockets $n'$, all the disks being placed in a steam tight box B, and in relation to each other, as represented on Plate 2, substantially as and for the purposes set forth.

3. Shelves, the top and bottom surfaces of each of which, are provided with flanges on three sides, combined with a steam tight box B, and a surrounding jacket $c'$, as represented on Plates 3, and 4, substantially as and for the purposes set forth.

J. HI. GLME. D. WAGNER.

Witnesses:
C. DEMOT,
A. GUION.